Oct. 13, 1959 H. C. WINKEL ET AL 2,908,377
APPARATUS FOR FORMING BATTERY COMPONENTS
Filed Jan. 18, 1956 10 Sheets-Sheet 2
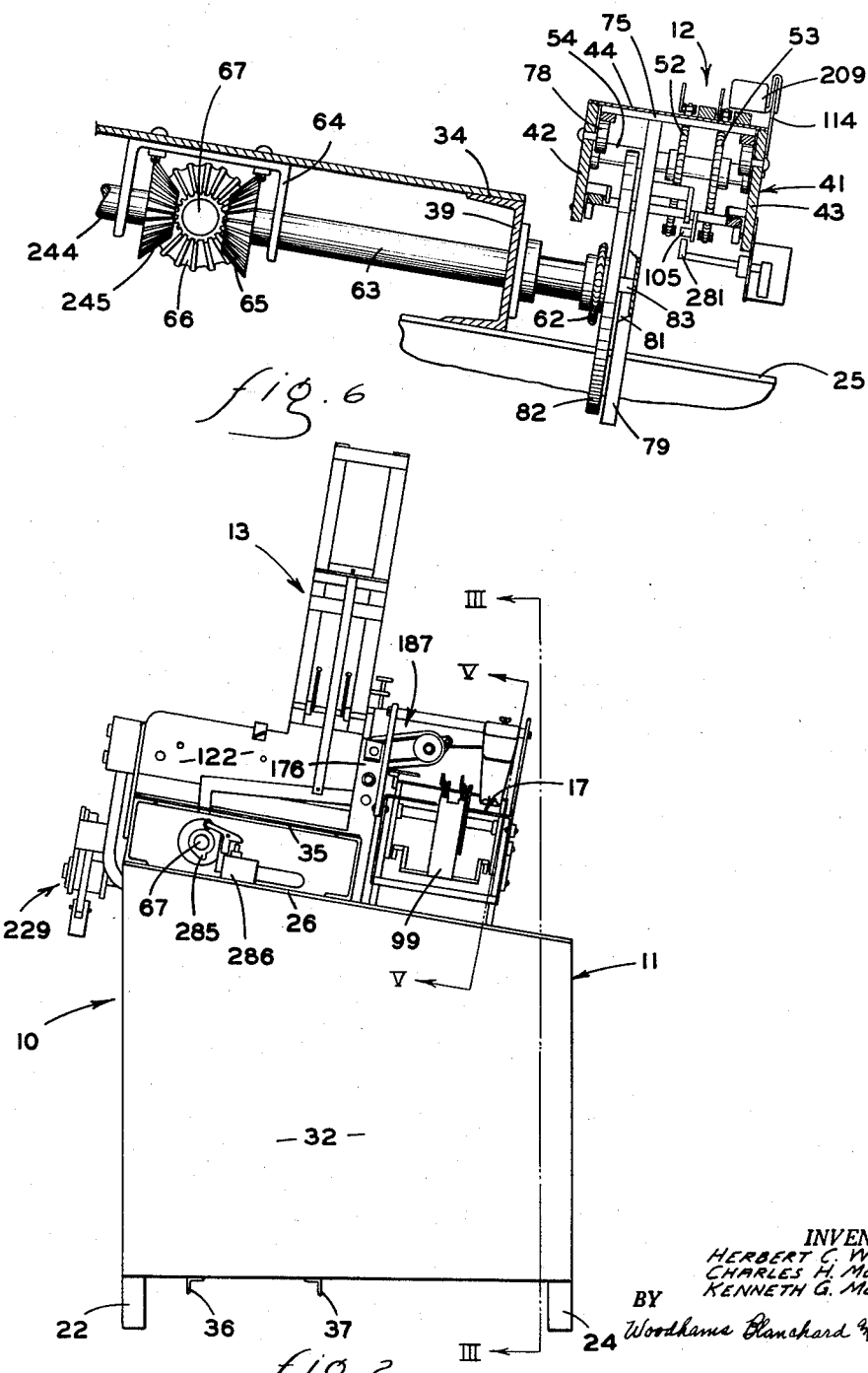

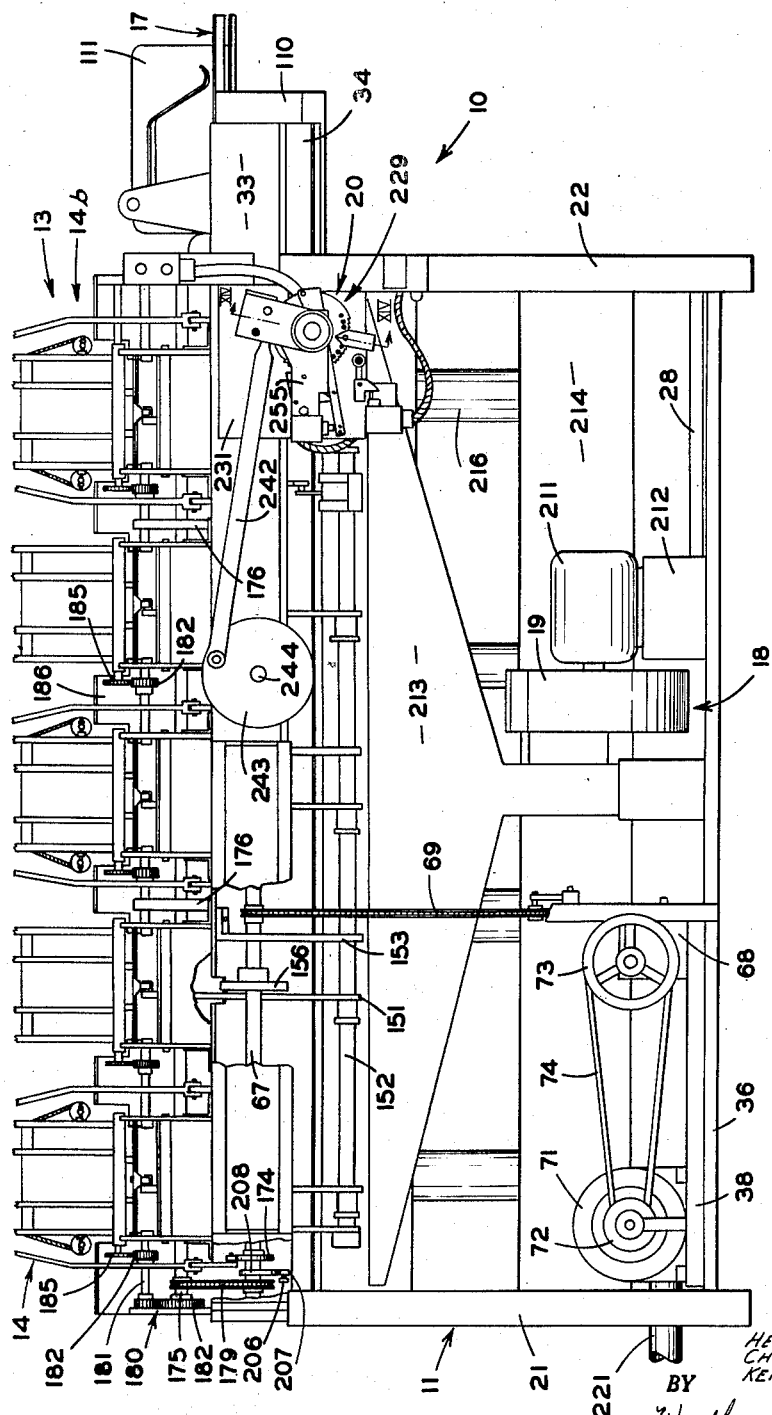

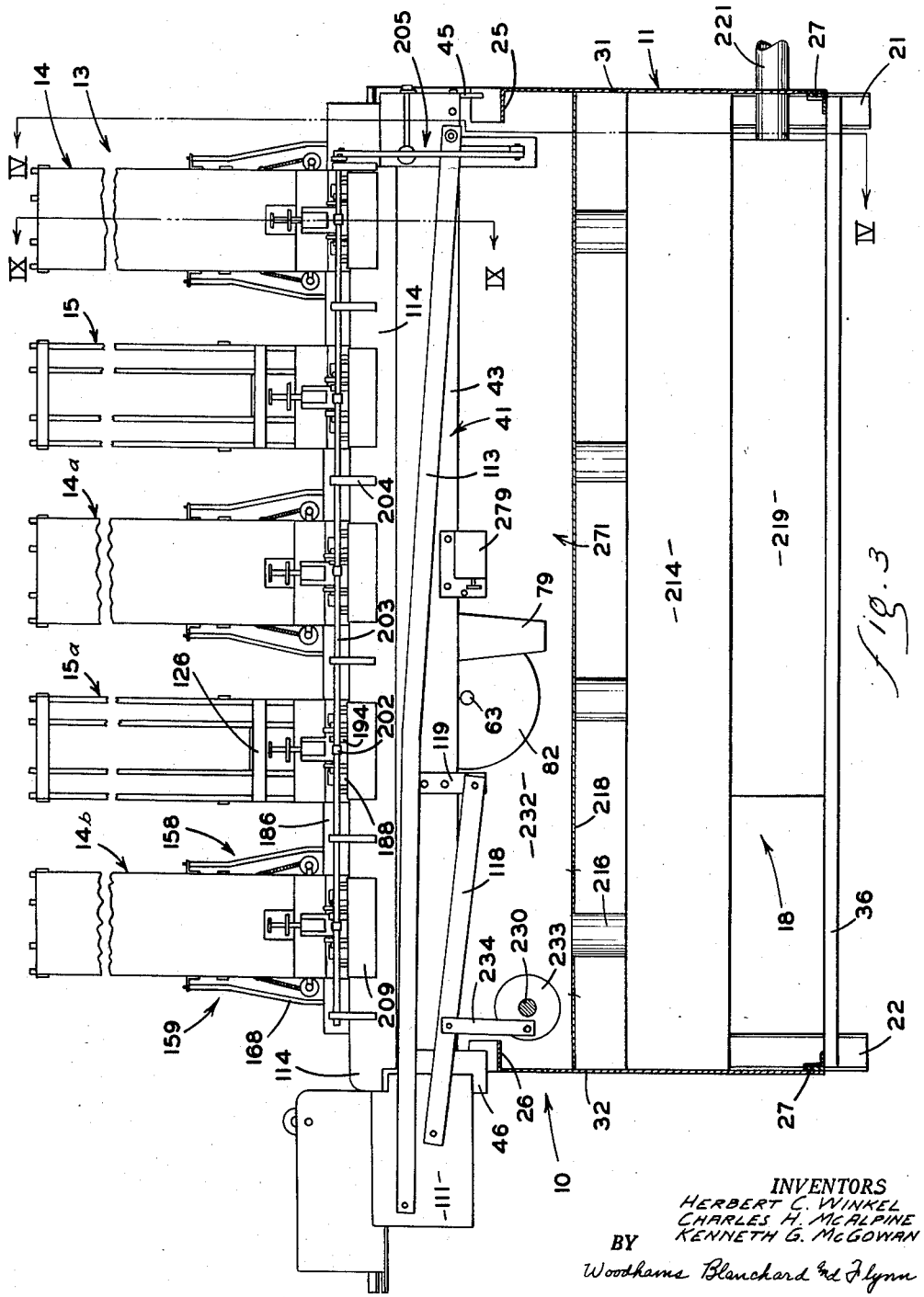

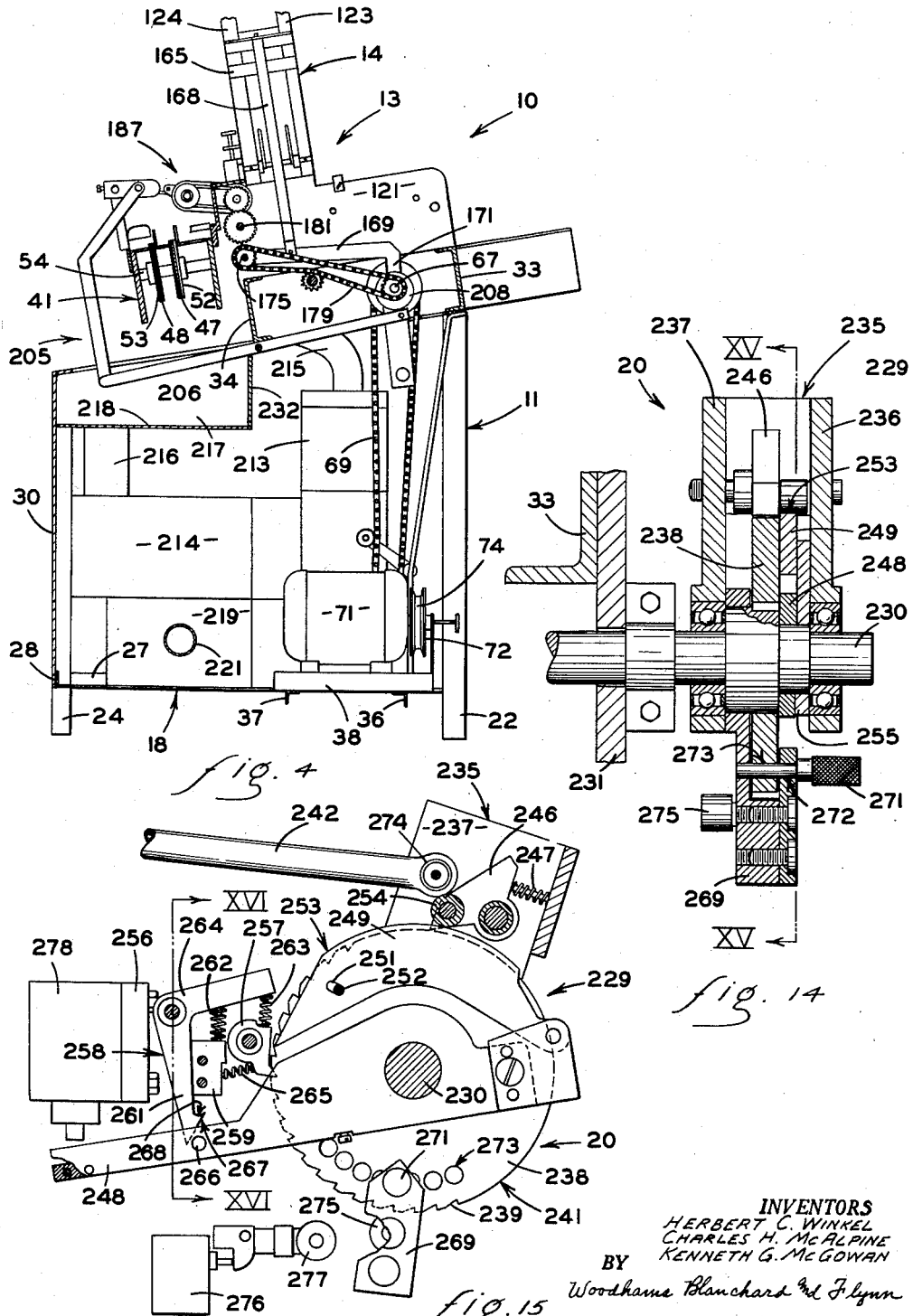

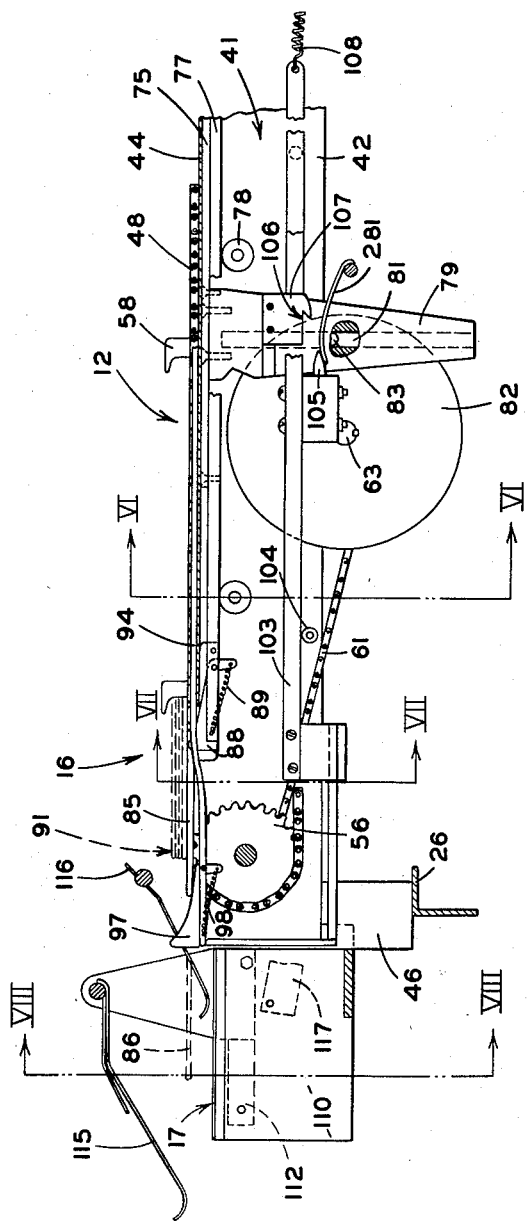

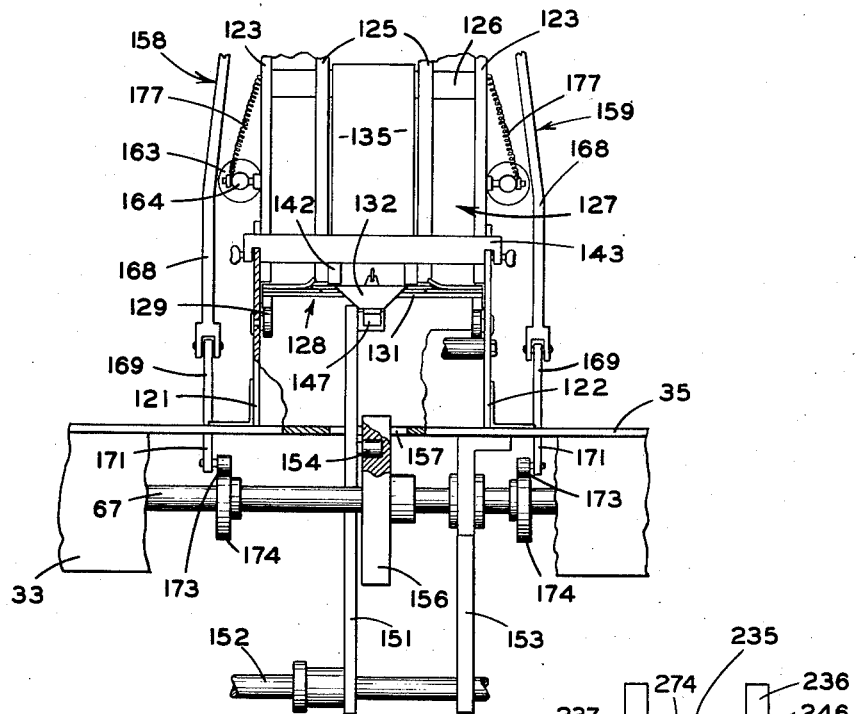
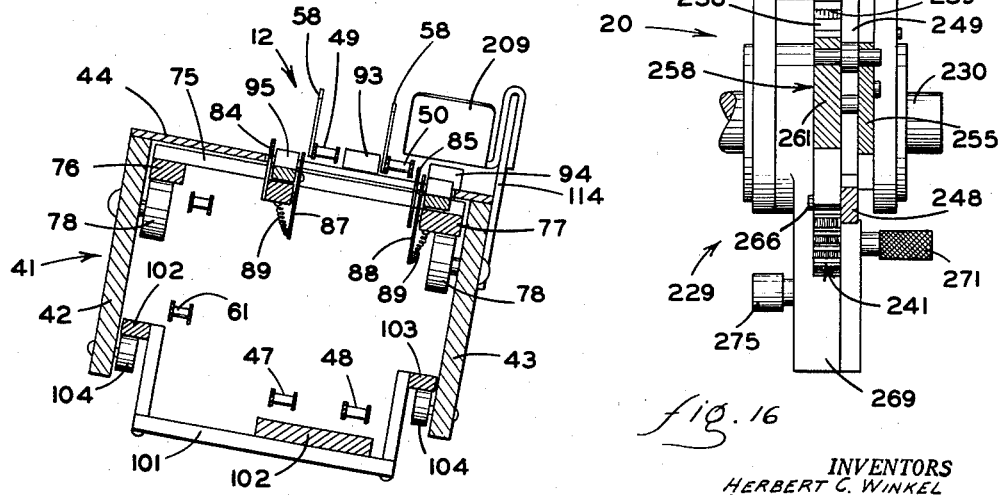

Oct. 13, 1959 H. C. WINKEL ET AL 2,908,377
APPARATUS FOR FORMING BATTERY COMPONENTS
Filed Jan. 18, 1956 10 Sheets-Sheet 7

INVENTORS
HERBERT C. WINKEL
CHARLES H. McALPINE
KENNETH G. McGOWAN
BY
Woodhams Blanchard and Flynn
ATTORNEYS

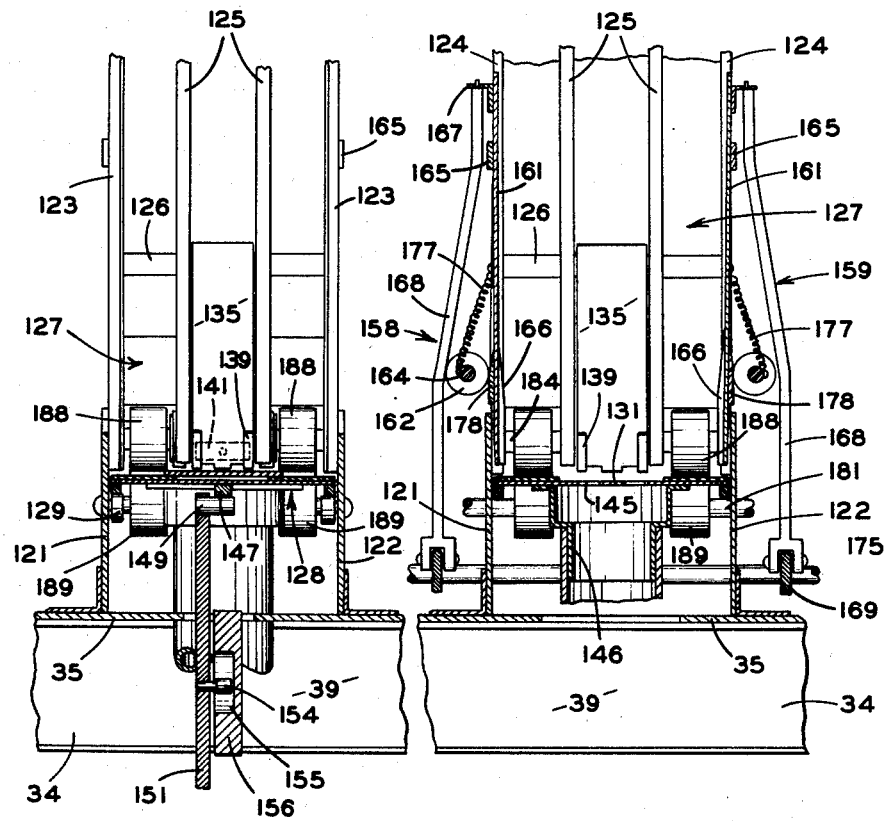

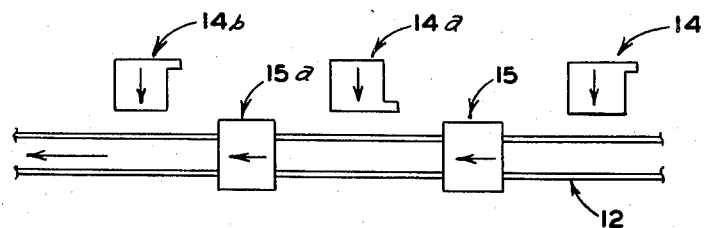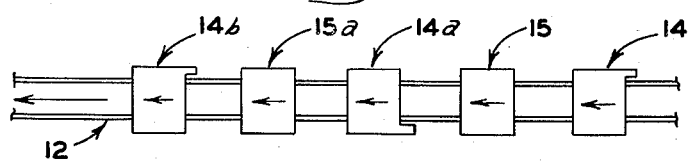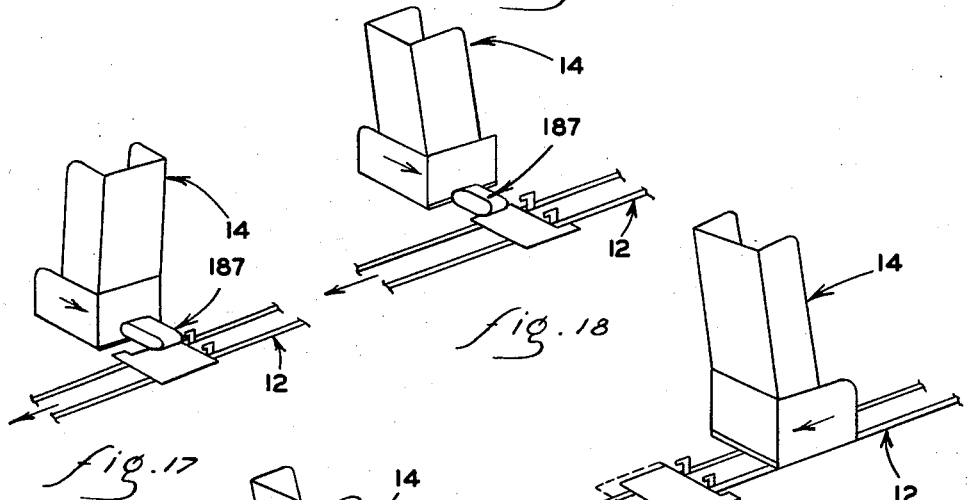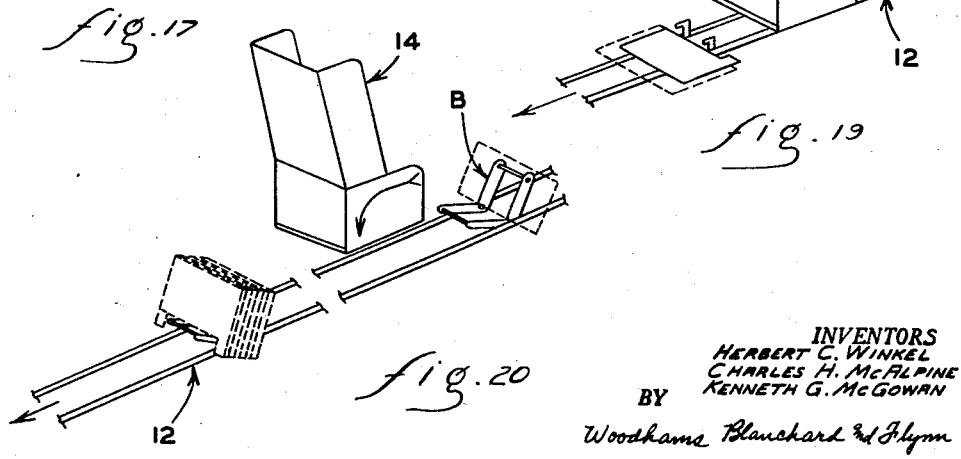

United States Patent Office 2,908,377
Patented Oct. 13, 1959

2,908,377

APPARATUS FOR FORMING BATTERY COMPONENTS

Herbert C. Winkel, Watervliet, Charles H. McAlpine, Coloma, and Kenneth G. McGowan, Lawrence, Mich.; said McAlpine and said McGowan assignors to said Winkel Application January 18, 1956, Serial No. 560,004

9 Claims. (Cl. 198—35)

This invention relates in general to an automatic machine for assembling a plurality of battery plates and plate separators into cell groups. More particularly, this invention relates to a machine having a structure for receiving and holding stacks of battery plates and battery plate separators, and having apparatus for successively removing plates and separators from said stacks and for assembling them into identical cell groups in a predeterminable arrangement.

Previous attempts to provide fully automatic machines for assembling cell groups of battery plates and plate separators have not been completely satisfactory for a variety of reasons. In the first place, the frangible nature of the battery plates and certain normal irregularities in their shapes have made it very difficult to provide a machine which would operate continuously, accurately, and without malfunctions. In order to overcome such malfunctions, it has been necessary, among other things, to operate present machines so slowly that the cell groups are assembled at a rate only slightly, if any, faster than the rate of hand assembly. The operation of said present machines is also slowed down by relatively long delays between element feeding cycles. For example, in some machines individual battery elements are fed at about the same time from a plurality of feeding devices onto a conveyor belt at intervals along said belt. Said belt is then moved the entire length of the machine to discharge such elements before another feeding operation can be conducted.

Accordingly, a primary object of this invention has been the provision of a fully automatic machine for assembling cell groups of battery plates and plate separators wherein large quantities of plates and separators arranged in separate, independent stacks may be received and wherein said plates and separators will be uniformly and substantially simultaneously removed from said stacks and arranged in cell groups of plates and separators.

A further object of this invention has been the provision of a machine, as aforesaid, which will assemble said cell groups of battery plates and separators at a much faster rate than was previously possible by machines of any kind known to exist, and much faster than they can be assembled by manual methods.

A further object of this invention has been the provision of a machine, as aforesaid, which is provided with structure for eliminating or avoiding any injury to, or disfiguration of, the battery plates and plate separators during the assembly operation.

A further object of this invention has been the provision of a machine, as aforesaid, having an exhaust system for removing any dust, such as toxic particles of lead oxide, which may be powered away from the pasted battery plates during the movement thereof by said machine in the assembling operation.

A further object of this invention has been the provision of a machine, as aforesaid, having mechanism for substantially reducing, if not eliminating, mal-functions in the feed apparatus due to irregularities in the structure or shape of the battery plates or plate separators caused by reasonably normal handling or during the fabrication thereof.

A further object of this invention has been the provision of a machine, as aforesaid, having safety switches for de-energizing the entire machine in the event there is a malfunction in said feeding apparatus, in spite of the mechanism provided to avoid such malfunctions.

A further object of this invention has been the provision of a machine, as aforesaid, which will operate successfully with a wide variety of different types of battery plates and an equally wide variety of different types of plate separators.

A further object of this invention has been the provision of a machine, as aforesaid, which can be readily adjusted for the assembling of battery groups having different numbers of cell groups therein.

A further object of this invention has been the provision of a device, as aforesaid, in which the supply stacks of battery plates and plate separators may be easily and quickly inserted therein for commencing the operation of the machine, and may be readily changed for changing the operation of the machine.

A further object of this invention has been the provision of a device, as aforesaid, which can be built in a wide variety of specific embodiments to meet a wide variety of specific operating requirements without sacrificing its ability to attain all, or a substantial part, of the foregoing named objects.

Other objects and purposes of this invention will become apparent to persons familiar with this type of equipment upon reading the following specification and examining the accompanying drawings, in which:

Figure 1 is a broken, side elevation view of a machine embodying our invention for assembling cell groups of battery plates and plate separators.

Figure 2 is a right end elevation view of said assembling machine as appearing in Figure 1.

Figure 3 is a sectional view, substantially as taken along the line III—III of Figure 2.

Figure 4 is a sectional view, taken along the line IV—IV of Figure 3.

Figure 5 is a sectional view, substantially as taken along the line V—V of Figure 2.

Figure 6 is a sectional view, taken along the line VI—VI of Figure 5.

Figure 7 is a sectional view, taken along the line VII—VII of Figure 5.

Figure 11 is an enlarged, broken fragment of Figure 1.

Figure 12 is a sectional view, taken along the line XII—XII of Figure 9.

Figure 13 is a sectional view, taken along the line XIII—XIII of Figure 9.

Figure 14 is a sectional view, taken along the line XIV—XIV of Figure 1.

Figure 15 is a sectional view, taken along the line XV—XV of Figure 14.

Figure 16 is a sectional view, taken along the line XVI—XVI of Figure 15.

Figure 17 is a schematic, oblique view of a feeding device disposed alongside of a portion of the conveyor mechanism, as disclosed in the preceding figures.

Figure 18 is a schematic, oblique view which differs from Figure 17 in that the battery elements are fed endwise instead of sidewise onto the conveyor.

Figure 19 is a schematic, oblique view of a feeding device disposed directly over the conveyor mechanism.

Figure 20 is a schematic, oblique view of a feeding device disposed above said conveyor, which has receptacles for receiving the battery elements in an upright position.

Figure 21 is a schematic, plan view of a plurality of feeding devices and a conveyor mechanism, part of the devices being over the conveyor and part being alongside of the conveyor.

Figure 22 is a schematic, plan view of a plurality of feeding devices located in line and above the conveyor mechanism.

Figure 8:
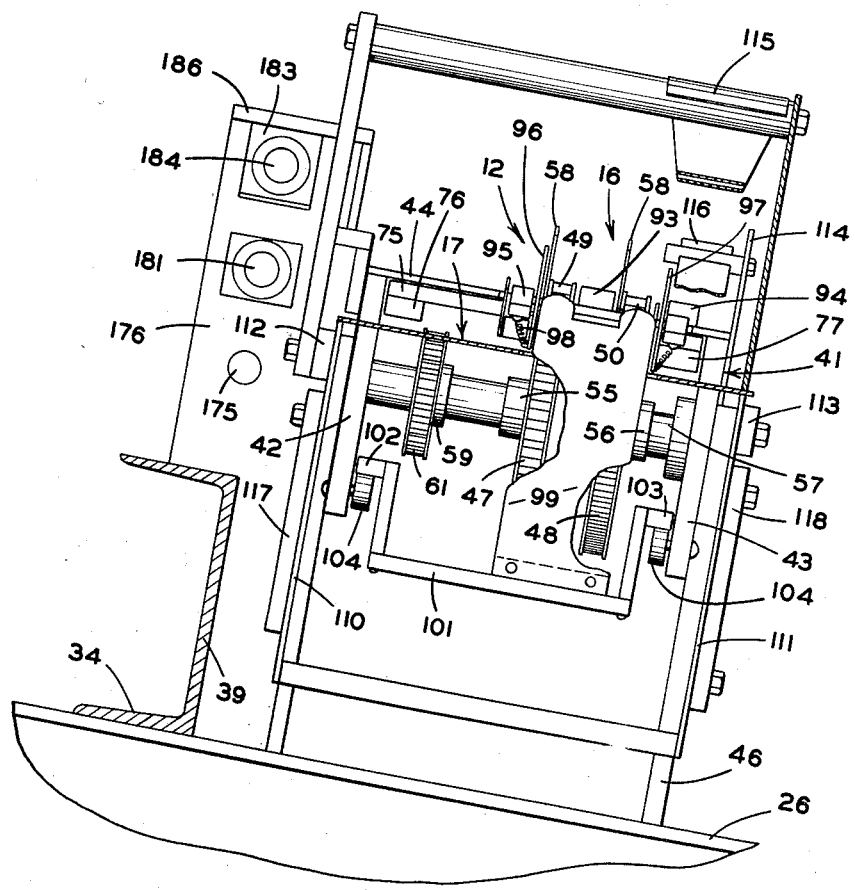
Figure 8 is a sectional view, taken along the line VIII—VIII of Figure 5.

For the purpose of convenience in description, the terms "upper," "lower," "front," "rear," and derivatives thereof, will have reference to the assembly machine and parts thereof as appearing in Figure 1. The terms "trailing end" and "discharge end" will have reference to the left and right ends, respectively, of the machine as appearing in Figure 1. The terms "inner," "outer," and derivatives thereof, will have reference to the geometric center of said machine and parts thereof.

GENERAL DESCRIPTION

In order to meet the objects and purposes set forth above, as well as others related thereto, we have provided an assembly machine 10 (Figures 1, 2, 3 and 4) comprised of a rectangular frame structure 11, which supports a conveyor mechanism 12 disposed lengthwise of the machine. A feeding apparatus 13, which is comprised of a plurality of feeding devices, such as the plate feeders 14 and the separator feeders 15, is disposed along the path of the conveyor mechanism 12 for feeding battery elements, such as plates and plate separators, respectively, onto the conveyor mechanism 12. A discharge mechanism 16 is provided at the discharge end of the conveyor mechanism 12 for discharging cell units of battery plates and plate separators onto the vertically movable platform 17. An exhaust system 18, including the centrifugal blower 19 (Figure 1), is provided for removing any dust which may be loosened from the lead oxide paste in the battery plates during the assembly thereof into said battery cell units by the machine 10. Mechanical and electrical timing mechanism 20 is provided for synchronizing the movements of the feeding apparatus 13, and the platform 17, with the motion of the conveyor mechanism 12. Control means is provided for automatically de-energizing said machine if there is a malfunction in the operation thereof.

In this particular embodiment of our invention, there are five feeding devices in the feeding apparatus 13. Starting at the trailing end of the machine, which is the rightward end in Figure 3, said feeding devices are comprised of: a negative plate feeder 14, a separator feeder 15, a positive plate feeder 14a, a separator feeder 15a, and a negative plate feeder 14b. The first four feeding devices, that is, all feeders except the last negative plate feeder 14b, feed one battery element onto the conveyor mechanism 12 each time the machine 10 operates through one cycle. However, the leading negative plate feeder 14b, adjacent to the platform 17, operates only when the last cell unit in any cell group is being completed.

DETAILED CONSTRUCTION

As shown in Figures 1, 2, 3 and 4, the frame structure 11 of the assembly machine 10 is provided with front legs 21 and 22 and a pair of rear legs, one of which is shown at 24, said front legs being longer than said rear legs for reasons appearing hereinafter. The upper ends of said front and rear legs, at corresponding ends of the structure 11, are connected by coplanar end plates 25 and 26, which, due to the longer length of said front legs, slope downwardly toward the rear of the frame structure 11, as appearing in Figures 2, 3 and 4. The lower ends of said legs are connected by parallel end braces 27 and a side brace 28. This leg structure is enclosed by a rear side sheet 30 and a pair of end sheets 31 and 32.

A pair of parallel channel members 33 and 34 extend between, and are supported upon, the end plates 25 and 26, the front channel member 33 being directly above the front legs 21 and 22, and the rear channel member 34 being disposed approximately midway between said front and rear legs. A support plate 35 extends between, and is mounted upon, the channel members 33 and 34, parallel with the end plates 25 and 26. A pair of parallel angle members 36 and 37 (Figures 3 and 4) are supported upon, and extend between, the end braces 27 to support a motor platform 38 near the front of the machine 10. The frame structure 11 is preferably, but not necessarily, fabricated from structural steel and sheet metal in this particular embodiment.

The conveyor mechanism 12 (Figures 2 to 8, inclusive) is mounted upon a conveyor frame 41, which is comprised of a pair of parallel, spaced side plates 42 and 43 (Figures 6 and 7), which support upon their upper edges a conveyor bed plate 44. The conveyor frame 41 is supported at the opposite ends thereof upon the end plates 25 and 26 by means, such as the support members 45 and 46, respectively, so that said bed plate 44 is parallel with, and spaced above, said end plates 25 and 26. The front side plate 42 of the conveyor frame 41 is preferably parallel with, and spaced rearwardly from, the web 39 of the rear channel member 34, as shown in Figures 6 and 8.

A pair of substantially identical, endless conveyor chains 47 and 48 (Figures 4 and 5) are disposed between the side plates 42 and 43 so that the upper courses 49 and 50 of said chains are disposed upon the upper surface of the bed plate 44, parallel with, and spaced from, each other. The conveyor chains 47 and 48 are supported at the trailing ends of the upper courses upon the sprockets 52 and 53, which sprockets are in turn mounted upon a shaft 54 (Figure 4) rotatably supported upon the side plates 42 and 43. Said conveyor chains 47 and 48 are supported at the discharge ends of their upper courses upon the sprockets 55 and 56, which are mounted upon the shaft 57 (Figure 8) rotatably supported between, and upon, the side plates 42 and 43. The chains 47 and 48 are each provided with a plurality of uniformly spaced hooks 58 (Figures 5 and 8), which extend upwardly from the upper courses of said chains, and are aligned in pairs transversely of said upper courses for simultaneously engaging plates and/or plate separators as they are fed onto said conveyor chains 47 and 48 by means described in detail hereinafter.

A drive sprocket 59, which is mounted upon the sprocket shaft 57 (Figure 8), is engaged by a chain 61 (Figure 5). The chain 61 engages a sprocket 62 (Figure 6) mounted upon the cam shaft 63 which extends through, and is rotatably supported upon, the web 39 of the rear channel member 34. Said cam shaft 63 is also supported upon a bearing support 64 secured to the support plate 35. The front end of the cam shaft 63 mounts a bevel gear 65 which engages a bevel gear 66 mounted upon, and rotatable with, the line shaft 67, which is substantially parallel with, and disposed between, the channel members 33 and 34 (Figures 1, 4 and 6). The line shaft 67 (Figure 1) is connected by a chain 69 to a gear box 68, which is operated by the motor 71 through the pulleys 72 and 73 and the interconnecting belt 74. The pulley 73 on the motor 71 may be a variable pitch type.

A table 75 (Figures 5, 6 and 7) is supported parallel with, and adjacent to, the lower surface of the bed plate 44 upon a pair of spaced support bars 76 and 77, which bars are adjacent to the side plates 42 and 43, respectively. Said bars 76 and 77 are supported, in turn, upon a plurality of rollers 78, which are mounted upon the side plates 42 and 43, so that the table 75 is movable lengthwise of the conveyor frame 41. A cam arm 79, which is secured at its upper end to the table 75, extends downwardly and has a substantially vertical cam slot 81 therein. A circular cam disk 82 is mounted upon the rearward end of the cam shaft 63 (Figure 6) and a cam follower 83 (Figures 5 and 6) extends from the rearward face of said cam disk 82 to be received into the cam slot 81 in the cam arm 79. Thus, rotation of the cam disk 82 by the cam shaft 63 effects a simple, harmonic movement of the cam arm 79 lengthwise of the conveyor frame 41.

The discharge end of the conveyor bed plate 44 is recessed, as shown in Figure 5, to receive the discharge end sprockets 55 and 56. A pair of support or transfer fingers 84 and 85 (Figures 5, 7 and 8) are mounted upon the discharge ends of the table support bars 76 and 77, respectively, so that their upper edges are substantially coplanar with the upper edges of the upper courses 49 and 50 of said chains 47 and 48. Thus, the transfer fingers 84 and 85 are reciprocated with the table 75 lengthwise of the conveyor frame 41 between their solid line position and their broken line position 86, as shown in Figure 5, each time the cam disk 82 is rotated.

A cell unit 91 (Figure 5) of plates and plate separators is urged by the hooks 58 onto the transfer fingers 84 and 85, after which both said hooks 58 and the transfer fingers 84 and 85 move leftwardly, as appearing in Figure 5. However, due to the harmonic motion of the cam arm 79, the hooks 58 will pass through a cycle of moving slower, then faster, and then slower again than the transfer fingers 84 and 85. A pair of discharge bars 87 and 88 (Figures 5 and 7) are pivotally mounted at their right ends upon the table support bars 76 and 77, respectively, and their left ends are urged upwardly by the springs 89. However, when the transfer fingers 84 and 85 are in their rightward, solid line position (Figure 5), said discharge bars 87 and 88 are held in their downward position by the left edge of the conveyor bed plate 44, under which said pusher bars extend. As the fingers 84 and 85 are moved leftwardly, the discharge bars 87 and 88 will also move away from the bed plate 44. Said pusher bars may be held down momentarily by the cell unit 91 until the hooks 58 move said unit past the left ends of said pusher bars. Due to said harmonic motion of the cam arm 79, the fingers 84 and 85 will be moving faster than the hooks 58 during the central portion of their reciprocation. Thus, the cell unit 91 will also move faster than the hooks 58, thereby permitting the hooks to go around the trailing end sprockets 55 and 56 without interfering with the cell unit 91.

Upper course guide bars 93 and 94 (Figures 5, 6 and 10) are disposed upon the conveyor bed plate 44 parallel with, and adjacent to, the rearward sides of the upper courses 49 and 50, respectively. The rear guide bar 94 and a short bar 95 disposed on the front side of the upper course 49 both extend beyond the discharge end of the conveyor bed plate 44 and are displaced slightly downwardly, as shown in Figure 5, beneath the level of the transfer fingers 84 and 85. A pair of stripping bars 96 and 97 (Figures 5 and 8) are pivotally supported at their trailing ends upon said guide bars 93 and 95, and are releasably held in raised position, as shown in Figure 5, by the springs 98. The stripping bars 97 and 96 are depressed by the cell unit 91 as it is urged over said stripping bars by the transfer fingers 84 and 85 working in combination with the discharge bars 87 and 88. However, as soon as said cell unit 91 passes beyond the leftward edges of said stripping bars 96 and 97, the springs 98 urge said stripping bars upwardly, thereby preventing return of the cell unit 91 when the transfer fingers 84 and 85 are reciprocated back into their solid line position, as shown in Figure 5. In this manner, the cell unit 91 is transferred from the conveyor mechanism 12 by the discharge mechanism 16 onto the platform 17.

Figure 9:
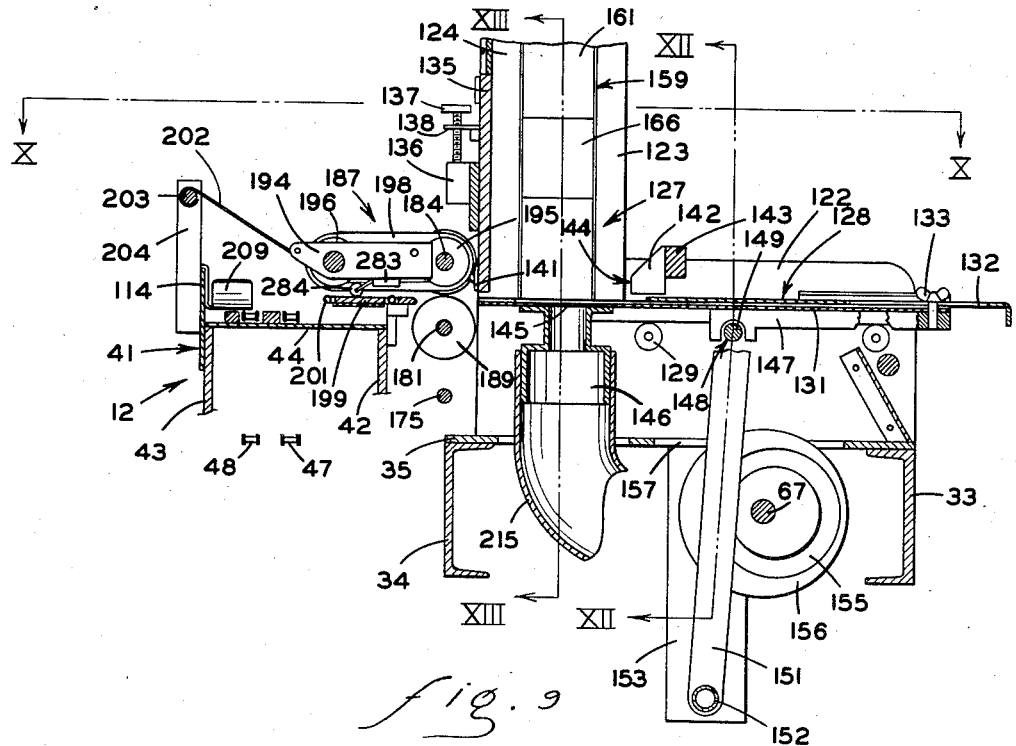
Figure 9 is a sectional view, taken along the line IX—IX of Figure 3 and rotated slightly counterclockwise into a vertical position.

As shown in Figures 3 and 9, the platform 17 is divided into two parallel, spaced sections between which a cell group pusher plate 99 is free to move leftwardly and rightwardly, as appearing in Figure 5. Said group pusher 99 is secured to the leftward end of a pair of pusher support bars 102 and 103 (Figure 7) by means of a transverse plate 101. Said pusher support bars are supported upon rollers 104, which are in turn secured to the side plates 42 and 43 for effecting a leftward and rightward reciprocation of the said group pusher 99, as shown in Figure 5.

A spring-loaded pawl 105 (Figures 5 and 6) is mounted upon the support bar 103 and is resistably movable upwardly by a pawl lever 281 for engagement with a notch 106 in a bracket 107 mounted upon, and extending rearwardly from, the cam arm 79, between the side plates 42 and 43. The support bars 102 and 103 are resiliently secured to the conveyor frame 41 by means such as the springs 108. Alternatively, a suspended weight, not shown, could be used in place of the springs 108. Thus, when the pawl 105 is urged upwardly into engagement with the notch 106, leftward movement of the cam arm 79, effected by rotation of the cam disk 82, causes the pusher support bars 102 and 103, hence the transverse plate 101, to be moved leftwardly, as appearing in Figure 5, against the contrary urging of the springs 108.

The platform 17 (Figures 3, 5 and 8) is supported upon the upper edges of a pair of side sheets 110 and 111 and said side sheets are secured to the leftward ends of a pair of elongated pivot bars 112 and 113 for vertical movement adjacent to the discharge end of the conveyor frame 41. The rightward ends of said pivot bars 112 and 113 are pivotally mounted upon the side plates 42 and 43, respectively, adjacent to the leading ends thereof. Said side sheets 110 and 111 overlap the discharge ends of the side plates 42 and 43, respectively, to prevent lateral movement of the platform 17 with respect to the frame 41. The side sheets 110 and 111 extend upwardly from the platform 17 for the purpose of preventing lateral displacement of the battery elements placed thereon by the discharge mechanism 16 at the discharge end of the conveyor mechanism 12. A side sheet 114 (Figures 3, 6 and 7) is secured to, and extends above, the rear side plate 43 to prevent lateral displacement of the battery elements as they are moved along the bed plate 44 by the conveyor chains 47 and 48. Resilient means, such as the spring 115, is mounted upon and between the upper extensions of the side sheets 110 and 111 on the platform 17 for the purpose of controlling the movement of the cell units of plates and separators as they are discharged onto said platform 17. Another flat spring 116 is mounted upon the side sheet 114 adjacent to said platform 17 for substantially the same purposes as the spring 115.

A pair of substantially identical elevator bars 117 and 118 (Figures 3, 5 and 8) are pivotally secured at their discharge ends upon the side sheets 110 and 111 directly below the pivot bars 112 and 113. The trailing ends of the said elevator bars are pivotally mounted upon means, such as the brackets 119, secured to the side plates 42 and 43 of the conveyor frame 41. Thus, upward and downward movement of the elevator bars 117 and 118 about their pivot points upon the brackets 119 effects an upward and downward movement of the platform 17. The means effecting such upward and downward movement of said elevator bars will be described hereinafter.

The feeding apparatus 13 is comprised, in this embodiment, of three uniformly spaced, plate feeding devices 14, 14a and 14b (Figures 1, 3, 9, 10 and 13), which are supported upon the frame structure 11 in a line adjacent the front side of the conveyor frame 41. A pair of separator feeding devices 14 and 15a are mounted upon the frame structure 11 intermediate, and in line with, each adjacent pair of said plate feeding devices 14, as shown in Figures 1 and 3. As indicated in Figures 1, 3, 12 and 13, the plate feeders 14 and separator feeders 15 may be substantially similar in general construction. However, for reasons appearing hereinafter, the plate feeders 14 are provided with an additional structure not found in the separator feeders 15. Accordingly, a detailed description will now be given of those structural features which are substantially common to both the plate feeders and the separator feeders. The additional structure required by the plate feeders will be specifically described where necessary.

As shown in Figures 9 through 13, inclusive, each feeding device has a pair of substantially parallel, spaced side plates 121 and 122, which are mounted upon the support plate 35, transversely of the channel members 33 and 34. A pair of spaced, upright side posts 123 and 124 (Figure 9) are secured to each side plate 121 and 122 near the rear end thereof, and a pair of spaced, upright end posts 125 (Figure 13) are disposed between the rearward side posts 123 and supported thereon by means of crossbars 126. The side posts 123 and 124 and end posts 125 cooperate to define three sides of a compartment 127 into which stacks of battery plates or battery plate separators are inserted. As shown in Figures 2 and 4, the posts 123, 124 and 125 are perpendicular to the sloped, upper surface of the frame structure 11 and, therefore, are inclined to the vertical. Thus, plates and/or separators placed within the compartment 127 will lean against the end posts 125 thereof. In the case of the plate feeder 14, an end wall sheet 128 is mounted upon, and across, the end posts 125 and the rear side posts 124 to confine any dust from the battery plates within the compartment 127.

Figure 10:
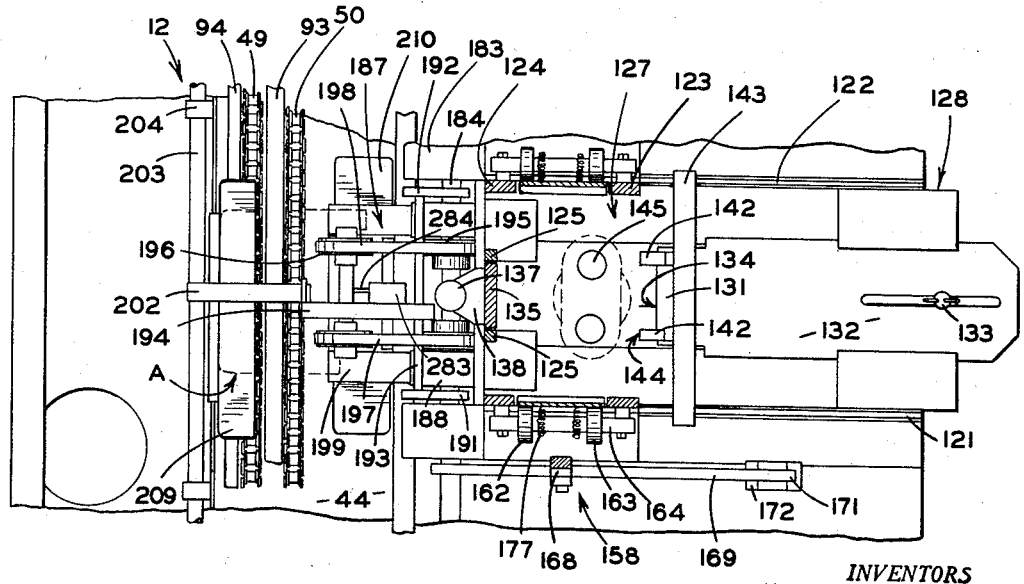
Figure 10 is a sectional view, taken along the line X—X of Figure 9.

A horizontally reciprocable shuttle member 128, which is substantially parallel with the support plate 35, is mounted along its lateral edges upon a plurality of rollers 129, which are rotatably supported upon the side plates 121 and 122 near to, but spaced from, the upper edges thereof. Said shuttle member is comprised of a flat, shuttle plate 131, which forms the bottom of the compartment 127, and a selector plate 132, which is secured upon the shuttle plate 131, as by means of the screw 133, for adjustment lengthwise of the plate 131. When the shuttle member 128 is in its retracted or frontward position, as shown in Figures 8 and 10, the selector plate 132 is spaced from the end posts 125 a distance somewhat greater than the width of the particular battery elements handled by the feeding device. When the shuttle member 128 is moved rearwardly, the rearward edge 134 of the selector plate 132 engages the bottom plate or separator in the stack within the compartment 127, urging said plate or separator rearwardly below and beyond the lower ends of the end posts 125.

A limit plate 135 is slidably disposed between the end posts 125 for vertical adjustment therebetween. Adjustment means, including an adjustment block 136 mounted upon the crossbar 126, an adjustment screw 137 extending into the adjustment block 136 and an adjustment plate secured to the limit plate 135, through which the adjustment screw is threadedly received, is provided for adjusting the lower edge of the limit plate 135 with respect to the upper surface of the shuttle plate 131, which is movable thereunder. A pair of downwardly extending positioning members 139 are pivotally mounted upon opposite edges of the plate 135 near its lower end and are resiliently prevented from being pivoted rearwardly, as shown in Figure 12, by the leaf spring 141. In this particular embodiment, the positioning members 139 extend downwardly a slightly greater distance than does the lower edge of the limit plate 135, as, for example, approximately .015 of an inch, for reasons appearing hereinafter.

A pair of stripping posts 142 are supported upon, and extend downwardly from, a transverse support bar 143, which is adjustably mounted upon the upper edges of the side plates 121 and 122, immediately frontward of the compartment 127. The rearward edges of said stripping posts 142 define the front end of the compartment 127 and, accordingly, prevent frontward movement of the stack of battery elements out of said compartment 127 when the shuttle member 128 is returned to its frontward, or rightward, position, as appearing in Figures 9 and 10, after feeding a battery element out through the rearward wall of said compartment.

One or more exhaust openings 145 are provided in, and through, that portion of the shuttle plate 131, near the rearward end thereof, which is disposed at the bottom of the compartment 127 when said shuttle member 128 is rotated. Any dust or powder within said compartment is removed through the exhaust openings 145 into the exhaust conduits 146, which communicate with the exhaust system 18, described in detail hereinafter. Particularly in the case of the separators, said exhaust system operates through said openings 145 to hold the battery elements firmly against the plate 131 during the movement thereof beneath the end posts 125. The separators, and sometimes the battery plates, become warped during handling or manufacture, and some means must be provided for holding them in a relatively planar position so they can pass uninterruptedly beneath said limit plate 135. Thus, the exhaust system 18, operating through the conduits 146 and the exhaust openings 145, provides means for dust removal, as well as for positioning of the battery elements for more efficient feeding thereof, hence, fewer malfunctions.

A pivot block 147 is mounted upon the lower surface of the shuttle member 128 and has a semi-cylindrical, downwardly opening pivot recess 148 disposed transversely of the shuttle member 128. A pivot roller 149, which is removably disposed within the pivot slot 148, is rotatably secured to the upper end of a pivot bar 151, whose lower end is pivotally mounted upon an elongated pivot shaft 152, which is supported upon the frame structure 11, as by the brackets 153, below and substantially parallel with the line shaft 67. A cam follower 154 (Figure 12) is rotatably mounted upon, and extends sidewardly from, the pivot bar 151, between the upper and lower ends thereof, for reception into an eccentric cam groove 155 in the face of a cam disk 156 mounted upon, and rotatable with, the line shaft 67, below the shuttle member 138. Thus, rotation of the line shaft 67, hence the cam disk 156, effects a horizontal reciprocation of the shuttle member 128 transversely of the machine 10, hence transversely of the conveyor mechanism 12. In this particular embodiment, both the pivot bar 151 and the upper portion of the cam disk 156 extend upwardly through a slot 157 (Figure 9) in the support plate 35.

A pair of substantially identical plate stack gripping mechanisms 158 and 159 (Figures 9, 10 and 13) are disposed upon opposite sides of each plate feeder 14. Since said gripping mechanisms are substantially identical, in this particular embodiment, the detailed description of one of said gripping mechanisms will be given herein and such will be understood to apply to both of said gripping mechanisms.

The gripping mechanism 158 is comprised of a vertically movable, gripping plate 161 (Figures 9, 10 and 13), which is slidably disposed between the side posts 123 and 124. A pair of cam rollers 162 and 163 are rotatably supported upon a substantially horizontal shaft 164 for engagement with the outer surface of the gripping plate 161. Said shaft 164 is mounted upon the side posts 123 and 124 near the upper edge of the side plate 122. The gripping plate 161 is prevented from falling outwardly from the compartment 127 by means of a crossbar 165 secured to the side posts 123 and 124 near the upper end, and outwardly, of said plate 161, and by means of the upper edge of the side plate 122. A flat, resilient gripping sheet 166, which may be fabricated from relatively soft rubber, is secured to the inner surface of the plate 161 near the lower edge thereof for engaging the adjacent edges of the battery plates disposed within the compartment 127. The upper portion of the gripping sheet 166 is beveled into the plane of the inner surface of the plate 161 so that only the lower battery plates within the compartment are engaged by said gripping sheet.

A flange 167 is secured to, and extends outwardly from, the plate 161 near the upper edge thereof. A lift bar 168 is releasably engaged at its upper end with the flange 167 and is pivotally mounted at its lower end upon a rocker arm 169 (Figures 2, 10, 11 and 13) between the ends thereof. The frontward end of the arm 169 has a downward extension 171 which extends through an opening 172 in the support plate 35 and rotatably supports a laterally extending cam follower 173 at the lower end thereof. The cam follower 173 is rotatably engageable with the periphery of the cam 174 mounted upon, and rotatable with, the line shaft 67. The rearward end of the rocker arm 169 is pivotally supported upon a line shaft 175, which in turn is rotatably supported, as by means of the bearing supports 176 (Figures 1 and 8) located at intervals lengthwise of the machine 10 and supported upon the rear channel member 34.

A pair of resilient members, such as the springs 177, are secured between the cam roller shaft 164 and the gripping plate 161 at points above said cam roller shaft for the purpose of assisting gravity in urging said plate 161, hence the forward end of the rocker arm 169, downwardly against the cam 174. Thus, the plate 161 is urged upwardly by the rocker arm 169 operating through the lift bar 168 each time the line shaft 67 is rotated. An upwardly and inwardly tapered cam plate 178 (Figure 13) is mounted upon the outer surface of the vertical plate 161, near the lower end thereof for engagement with the cam rollers 162 and 163. Thus, as the gripping plate 161 is raised by the cam 174, the cam strip 178, upon being engaged by the cam rollers 162 and 163, urges the lower end of said plate 161 inwardly toward the stack of battery plates disposed within the compartment 127 for the purpose of engaging the adjacent edges of said plates. The bottom, expanded end of the cam strip 178 may be arranged for engaging the upper adjacent edge of the side plate 122 for the purpose of limiting the downward movement of the plate 161 and thereby preventing its interference with the reciprocable movement of the shuttle member 128.

Since the gripping mechanisms 158 and 159 are substantially identical, upward movement of their respective gripping plates 161 will cause the lower ends of said plates to move toward each other as they move upwardly, thereby gripping the opposite lateral edges of the battery plates disposed therebetween for the purpose of raising the stack of said plates and relieving the pressure on the lower one or two within said stack. Thus, the shuttle member 128 can move the bottom one of said plates out through the rearward wall of the compartment 127 without impedance from frictional resistance due to the load of the stack. Obviously, elimination of the load also eliminates the possibility of damage or disfiguration of said plates due to scraping or forcing the battery plate out from under the stack above it.

In some cases, as hereinafter indicated in more detail, it is desirable to feed the battery plates endwise onto the conveyor 12 from plate feeders 14 located along the side of the conveyor as shown in Figures 18 and 21. However, the dimension of the battery plates which is horizontal in normal use is substantially constant for various sizes and types of battery plates whereas the dimension which is vertical in normal use often varies widely. Thus, it will be advantageous to place the gripping mechanisms 158 and 159 at the front and rear ends of the compartment, namely, the ends intersected by the direction of movement of the shuttle, rather than at the sides of the compartment as shown in Figures 10, 12 and 13. In such case, it may be desirable to load the feeding device from the side (Figure 18).

As shown in Figures 1 and 4, the line shaft 175 is driven from the line shaft 67 by the chain 179, which is engageable with sprockets mounted upon the line shafts 67 and 175 near the trailing end of the machine 10. A drive shaft 181 is rotatably supported upon said bearing supports 176 parallel with, and directly above, the line shaft 175. The drive shaft 181 and the line shaft 175, which are mutually engaged by gears 180, are disposed between the rearward sides of the compartments 127 of the feeding devices 14 and 15, and the frontward side of the conveyor frame 41. A pinion 182 is mounted upon, and rotatable with, said drive shaft 181 adjacent to the leftward or trailing side (Figure 1) of each of said feeding devices.

A bearing housing 186 is disposed above the drive shaft 181 between each pair of adjacent feeding devices along the length of the machine 10. Vertically adjustable bearing blocks 183 are supported within each bearing housing 186 for rotatably receiving and supporting the opposite ends of a plurality of stub shafts 184, each stub shaft extending between two adjacent bearing housings. Said stub shafts are disposed parallel with, and directly above, the drive shaft 181, and each of said stub shafts supports a pinion 185, which is engageable with said pinions 182 on the drive shaft 181, whereby a counter-rotation is effected between the stub shafts 184 and the drive shaft 181.

Each feeding device, such as the plate feeders 14 and the separator feeders 15, is provided with a feeding mechanism 187 (Figures 2, 4, 9 and 10). Said feeding mechanism 187 is comprised of two pairs of resilient, peripherally engaged feed rollers 188 and 189 mounted upon the stub shafts 184 and the drive shaft 181, respectively. Said pairs of rollers are spaced from each other and disposed adjacent to the rearward wall of each feeding device 14 and 15 for engaging said battery elements as they are urged under the rearward wall of the compartment 127 by the shuttle member 128.

A pair of spaced, pivot arms 191 and 192 (Figure 10) are pivotally supported upon each stub shaft 184 and extend rearwardly therefrom, where they are secured at their outer ends to the opposite ends of a rod 193, which is substantially parallel with, and spaced rearwardly from, its stub shaft 184.

A support bar 194 extends rearwardly from, and is secured to, said rod 193. A pair of pulleys 195 is mounted upon the stub shaft 184 adjacent to the respective, opposing faces of the two feed rollers 168 supported thereon. Another pair of pulleys 196 is rotatably mounted upon opposite sides of the support bar 194 near its rearward, free end. The front pulleys 195 are connected to the rear pulleys 196 by a pair of belts 197 and 198. Thus, rotation of the stub shaft 184 by the inter-action of the pinions 185 and 182 effects a movement of the belts 197 and 198 so that the lower courses thereof move rearwardly.

A battery element support plate 199 (Figure 9), having a pair of spaced, transverse rollers 201 therein, is mounted upon the conveyor frame 41 rearwardly of each feeding device and directly under each feeding mechanism 187. Thus, when the battery elements are urged rearwardly by the shuttle element 128, they are first engaged by the feed rollers 188 and 189, after which they are engaged between the lower courses of the belts 197 and 198 and the upper peripheries of the rollers 201 in the support plate 199, whereby said battery elements are moved from the compartment 127 onto the upper courses of the conveyor chains 47 and 48.

The rearward, free end of each support bar 194 is engageable by one end of a lift finger 202 (Figures 9 and 10), of which there is one for each feeding mechanism 187, the other end of said lift finger being secured to a rocker shaft 203. As shown in Figures 3 and 4, the rocker shaft 203 is pivotally mounted by means of the brackets 204 upon the side sheet 114 along the rearward edge of the conveyor frame 41. The rocker shaft 203 is pivoted through an arc of approximately 45°, in this particular embodiment, by means of linkage 205, which connects said shaft 203 to the line shaft 67. Said linkage includes a rocker bar 206, which is pivoted between its ends upon the frame structure 11 and has a cam follower 207 rotatably mounted upon its frontward end and engaging the periphery of a cam 208 mounted upon, and rotatable with, the line shaft 67, as shown in Figure 4.

A guide member 209 is mounted upon the side sheet 114 opposite each one of the feeding devices 14 and 15, said member being disposed above the conveyor bed 44 at a distance permitting the passage of the battery elements carried by the conveyor chains 47 and 48 therebeneath. A similar guide member 210 is mounted beneath and upon each support plate 199 for substantially the same purposes as the guide member 209. Thus, the feeding mechanism 187 urges a battery element out of its respective compartment 127 onto the guide members 209 and 210, which are directly rearward of the particular feeding device concerned. However, that particular battery element will move under the guide members 209 and 210 of all subsequent feeding devices which it passes as it is urged by said conveyor mechanism 12 toward the discharge end of the machine 10.

The exhaust system 18 (Figures 1, 3 and 4) includes a centrifugal blower 19 operated by a motor 211 mounted by means of a motor pedestal 212 upon the motor platform 38 at the bottom of the frame structure 11. The blower inlet is connected in a conventional manner to a front plenum chamber 213 and rear plenum chamber 214. The front plenum chamber 213 is in turn connected to the exhaust conduits 146 (Figure 9) by flexible pipes 215. The rear plenum chamber 214 is connected by pipes 216 to the chamber 217, disposed below the conveyor frame 41, through the lower wall 218 of said chamber. The centrifugal blower 19 exhausts into an exhaust plenum 219, which is connected to an exhaust duct 221. The exhaust chamber 217, being under the conveyor mechanism 12, will catch any dust or particles which are loosened from the battery elements during their movement to the discharge end of the machine 10.

It is standard practice in the fabrication of storage-type batteries to have a negative battery plate at both ends of each cell group of plates and separators. However, where a cell group includes more than one cell unit, which is the normal case, only the last cell unit in each cell group will have the extra negative plate. This means that the automatic machine for assembling cell groups must automatically distinguish the last cell unit in any cell group and then deposit one negative plate thereon to complete the cell group.

The timing mechanism 20 (Figures 1, 3, 5, 14 and 15) is provided for effecting the operation of said last negative plate feeder 14b at a preselectable time with reference to the operation of the remainder of the feeding devices in the feeding apparatus 13 and the conveyor mechanism 12. Said timing mechanism 20 also controls the vertical reciprocation of the platform 17 and the energization of the cell group pusher 99.

The timing mechanism or control 20 includes a timing shaft 230 (Figures 1, 3 and 15), which is disposed transversely of the machine 10 adjacent to the discharge end thereof. Said shaft 230, which is substantially parallel with, and disposed below, the upper, sloping surface of the frame structure 11, extends through, and is rotatably supported at its front end upon, a front plate 231 mounted upon, and extending below, the front channel member 33. The rearward end of the timing shaft 230 extends through the front wall 232 of the exhaust chamber 217 (Figure 3) to a point beneath the elevator bar 117, where a disk 233 is mounted thereon. A link bar 234 is pivotally connected at its lower end to the elevator disk 233 at a point spaced from the center thereof, and is pivotally connected at its upper end to the elevator bar 117 between the ends thereof. Thus, oscillatory movement of the disk 233 through a portion of its circumference will effect a corresponding upward and downward pivotal movement of the elevator bar 117, hence of the platform 17. A similar disk and link bar, not shown, are provided to operate in conjunction with the elevator bar 118 on the opposite side of the platform 17.

The timing head 229 (Figures 14, 15 and 16) includes a rectangular housing or pivot member 235 having a pair of spaced, parallel side walls 236 and 237, through which the timing shaft 230 extends for the purpose of pivotally supporting said housing 235. A timing disk 238 is secured upon, and rotatable with, the timing shaft 230 between the side walls 236 and 237. Said timing disk is provided with a plurality of uniformly spaced notches 239 in the periphery 241 thereof. One end of a link rod 242 is pivotally secured to the upper end of the housing 235, the other end of said rod being pivotally connected to one axial face of an actuating disk 243 near the periphery thereof. The disk 243 is mounted upon, and rotatable with, the front end of an actuating shaft 244, which is preferably, but not necessarily, coaxial with the cam shaft 63. Said actuating shaft 244 may be provided with a bevel gear 245 engageable with the bevel gear 66 on the line shaft 67. Said actuating shaft 244 may be rotatably supported by conventional means mounted upon the front channel member 33, through which said shaft extends, and the bearing support 65 (Figure 6) depending from the support plate 35. By proper selection of the pivot point of the link rod 242 upon the actuating disk 243, the housing 235 is reciprocated through an arc of approximately 90° with each rotation of the actuating disk 243.

A pawl 246 (Figure 15) is pivotally supported upon, and between the side walls 236 and 237 and is urged toward engagement with the notches 239 in the periphery 241 of the disk 238 by a spring 247. An elongated lever arm 248 is rotatably supported upon the timing shaft 230 adjacent to the front side of the timing disk 238. An arcuate timing arm 249, which preferably lies substantially within the same plane as the lever 248, is pivotally mounted at one end upon one end of the lever 248. The other end of said arm 249 is provided with a slot 251, through which a pin 252, secured to the adjacent side of the timing disk 238, extends. Thus, upward movement of the leftward end of the lever 248, as appearing in Figure 15, effects a downward and rightward movement of the timing arm 249. The upper, arcuate surface 253 of the timing arm 249 has a radius slightly greater than the radius of the timing disk 238. Thus, when the leftward end of the lever 248 is in its lowered position, said arcuate surface 253 of the arm 249 extends radially outwardly beyond the periphery 241 of the timing disk 238. A roller 254 is mounted upon, and extends frontwardly from, the pawl 246 for engagement with said upper surface 253 of the arm 249. When the leftward end of the lever 248 is in its lowered position, the engagement between the roller 254 and the arcuate surface 253 prevents engagement between the pawl 246 and the notches 239 throughout the length of said arcuate surface 253. However, during the arcuate movement of the housing 235, caused by the link rod 242, said pawl 246 moves beyond the arcuate surface 253 to engage a notch 239 and rotate the disk 238 in a counterclockwise direction, as appearing in Figure 15, a portion of the arcuate distance between two of the adjacent notches 239, for reasons appearing hereinafter.

A latch support bar 256 (Figure 15) extends forwardly from, and is secured to, the front plate 231. A latch plate 255 (Figures 1 and 16), which is parallel with, and spaced forwardly from, the front plate 231 (Figure 14), is rotatably mounted at one end upon the timing shaft 230 and secured at its other end upon the front end of said latch bar 256. The latch plate 255 is disposed adjacent to, and frontwardly of, the lever 248. A stop pawl 257 is pivotally supported on the rearward face of the latch plate 255 for engagement with the notches 239. Said stop pawl 257 and the notches 239 are arranged so that engagement therebetween will prevent clockwise rotation of said timing disk but will permit counterclockwise rotation thereof. An L-shaped lever latch 258 (Figures 15 and 16) is pivotally supported at the junction of its arms upon the rearward face of the latch plate 255 radially outwardly from the pawl 257 with reference to the axis of the timing shaft 230. A latch stop block 259 is supported upon said rear face of the latch plate 255, between the downwardly extending arm 261 of the lever latch and the pawl 257, and has a substantially vertical face remote from said timing shaft 230 for engaging said arm 261 of the lever latch 258. The said lower arm 261 of the latch 258 has a hook at its lower end for purposes appearing hereinafter.

A pair of spiral springs 262 and 263 are held in compression between the upper, substantially horizontal and rightwardly extending arm 264 of said latch 258 and the upper surfaces of the latch block 259 and the pawl 257, respectively. The pawl spring 263 engages said pawl on the rightward side of its pivotal axis, as appearing in Figure 15, thereby tending to urge said pawl to rotate in a clockwise direction, hence out of engagement with the notches 239 in the timing disk 238. However, another spiral spring 265 is disposed between the stop block 259 and said pawl 257 at a point below its pivotal axis, which tends to urge said pawl 257 toward said disk 238 and into the notches 239. The lower pawl spring 265 is either under greater compression or is a stronger spring, whereby said pawl 257 is continuously urged toward the notches 239, thereby overpowering the upper pawl spring 263 when the lower latch arm 261 is against, or very close to, said stop block 259. The spiral springs 262 and 263 urge the latch lower arm 261 against the block 259.

A lock pin 266 is secured to, and extends rearwardly from, the lever 248 near its left end for engagement with the cammed surface 267 on the lower end of the lower arm 261 when said lever left end is raised. Said cammed surface leads up to the hook 268 on the right edge of said lower arm 261. Thus, as the left end of the lever 248 is moved upwardly, the interengagement between the lock pin 266 and the surface 267 effects a clockwise rotation of the lever latch 258 about its pivot point on the latch plate 255, against the compression of the springs 262 and 263 until said pin 266 passes over the hook 268. Then the hook engages said pin, thereby holding said lever left end in a raised position, and the lever lower arm 261 moves back against the block 259. However, due to the undercut nature of the notches 239, the pawl 257 will remain in engagement with the notch 239 during the compression of the springs 262 and 263 caused by the engagement of said pin and cammed surface 267.

The leftward end of the lever 248 is raised by a lever actuating arm 269, which is pivotally supported upon the timing shaft 230 and which is adjustably and releasably attached by the pin 271 to the timing disk 238 for movement therewith. Said pin 271 is removably extendable through an opening 272 in said actuating arm 269, and also is insertable through one of a plurality of pin openings 273 through the timing disk 238 near the periphery thereof. Thus, as the disk 238 is rotated clockwise, the arm 269, which is secured thereto by the pin 271, eventually engages said lever 248 and urges its leftward end upwardly until the pin 266 is latched within the hook 268.

The lever 248 will remain in such latched position, engaged by the lever latch 258, until the upper arm 264 is engaged and depressed by the latch roller 274 rotatably supported upon the housing 235 between the side walls thereof. Such engagement between the roller 274 and lever latch 258 is effected when the housing 235 is moved in a counterclockwise direction, as appearing in Figure 15, into its extreme leftward position by the link rod 242. This releases the lever from engagement with the latch 258 and thereby permits said lever to return to its Figure 15 position, whereupon the timing arm 249 returns into its upper and leftwardly blocking position, as shown in Figure 15.

As the lever actuating arm 269 approaches the lever 248, a switch roller 275 (Figure 14) mounted upon said actuating arm 269 engages and closes a clutch switch 276 mounted upon the front plate 231. Closure of switch 276 actuates a clutch, not shown, which couples the cam disk 156, associated with the plate feeder 14b (Figure 1), to the line shaft 67. Thus, when said clutch switch 276 is closed, the shuttle member 128 of the plate feeder 14b is actuated to advance one negative plate onto the conveyor mechanism 12 in substantially the same manner as described hereinabove with respect to the plate feeder 14.

A group pusher switch 278 is mounted upon the latch support bar 256 near the front end thereof. A switch bar 277 is secured to the leftward end of the lever 248 (Figure 15) and extends rearwardly therefrom for engaging and closing the pusher bar switch 278. When said pusher switch 278 is thus closed, it energizes a solenoid 279 (Figures 3, 5 and 6), which is mounted upon side plate 42 of the conveyor frame 41. Said solenoid 279 is operably connected to a pawl lever 281 which engages the pawl 105 and urges it upwardly into position for engaging the notch 106 in the bracket 107 secured to the cam arm 79. Thus, when the pusher bar switch 278 is closed by the lever 248, the pawl 105 is moved into position by the solenoid 279 so that the next leftward movement of the cam arm 79 (Figure 5) will effect an operation in a leftward direction (Figure 5) of the cell group pusher 99. It will be observed that the clutch switch 276 is closed before the pusher bar switch 278 is closed. Thus, the last negative plate feeder 14b will deposit a negative plate upon the cell unit, which will become the last cell unit in the cell group, and such cell unit will be deposited upon the platform 17 by the discharge mechanism 16 before the pusher switch 278 is closed, thereby actuating the cell group pusher 99.

As shown in Figure 3, the link bar 234 extends from the elevator bar 117 to the elevator disk 233 on the leftward side of the timing shaft 230. Thus the weight of the platform 17 and all parts associated therewith, including the side sheets 110 and 111, the pivot bars 112 and 113, and the elevator bars 117 and 118, tends to urge the elevator disk 233 in a counterclockwise direction, as appearing in Figure 3. Since said disk 233 and the timing disk 238 are mounted upon the opposite ends of the same timing shaft 230, said weight of the platform 17 and associated parts tends to urge a clockwise rotation of the timing disk 238, as appearing in Figures 1 and 15. The stop pawl 257, by its engagement with any one of the notches 239 (Figure 15), prevents said clockwise rotation of the disk 238, as stated above.

As shown in Figures 9 and 10, each feeding mechanism 187, except that associated with the last plate feeder 14b, is provided with a normally open feed switch 283, which is supported upon the support bar 194 between the pulleys 195 and 196. Said switch 283 has a switch arm 284, which extends downwardly toward, but does not engage, the support plate 199. When the feeding mechanism 187 is in its lowered position, as appearing in Figure 9, and there is no battery element disposed between the feeding mechanism and said support plate 199, said switches 283 will be open. However, when a battery element is passing over the support plate 199, the switch arms 284 will be raised, thereby closing the feed switches 283. The feed switches 283 are all connected in series and, therefore, if any one of the feeding devices 14 and 15 fails to feed a battery element onto the conveyor mechanism 21 at the simultaneous and appointed time, the series circuit between said feed switches 283 will be broken.

A disconnect cam 285 (Figure 2) is mounted upon the discharge end of the line shaft 67 for engaging a normally closed disconnect switch 286. The disconnect cam is so arranged that it will open the disconnect switch 286 for a moment when the feed switches 283 will be closed by the battery elements passing therebeneath, if the machine 10 is functioning properly. The series circuit of the feed switches 283 is in parallel with the switch 286 in the power circuit which energizes the motor 71. Thus, if any one of the feed switches 283 is not closed when the disconnect switch 286 is opened by the cam 285, the machine 10 will be de-energized, thereby preventing the assembly of defective cell units and cell groups.

OPERATION

As will be observed from the above detailed disclosure of the construction of the automatic assembling machine, the conveyor mechanism 12, the feeding devices 14 and 15 of the feeding apparatus 13, the feeding mechanisms 187, the discharge mechanism 16, the platform 17, and the timing mechanism 20 are all coupled together by various chains, sprockets and gears, as described above, for operation by a single motor 71. The exhaust system 18 is operated by an independent source of energy provided by the blower motor 211. Thus, the speed of operation of the assembling machine 10 may be varied by altering the pitch of the variable pitch pulley 72 mounted upon said motor 71. After such operating speed has been selected as desired or required, the plate feeders 14 and 14b are loaded with stacks of negative battery plates, plate feeder 14a is loaded with a stack of positive battery plates, and the separator feeders 15 and 15a are loaded with stacks of plate separators. The lever actuating arm 269 is adjusted upon the timing disk 238 by means of the adjustment pin 271 so that said timing disk 238 will move arcuately through a pre-selected distance which will correspond both to the number of cell units which will be formed by the assembling machine before the cell group is assembled and the distance which the platform 17 will be lowered during the formation of the cell group. The structure of the machine is such that the lowering of the platform 17 will automatically correspond to the number of units being formed.

The limit plate 135 is adjusted vertically by the screw 137 with respect to the shuttle plate 131 in each of the feeding devices 14 and 15 to permit one battery element at a time to be fed therebetween by their respective shuttle members 128. The selector plate 132 is adjusted upon the shuttle plate 131 to correspond to the size and type of battery element being fed thereby in the particular instance. Likewise, the transverse support bar 143, carrying the stripping posts 142, is adjusted along the side plates 121 and 122 with respect to the end posts 125, also to correspond to the size of said battery elements. With this preparation, the machine 10 is ready for operation so that the motors 71 and 211 thereof can be energized.

With each turn of the line shaft 67 through 360°, the assembling machine 10 completes one element feeding cycle, and four such feeding cycles produce a cell unit cycle. A plurality of unit cycles, the exact number depending upon the number of cell units in a cell group, produces a cell group cycle of operation. The operation of the assembling machine through the above three cycles will now be described in detail, starting with the feeding cycle.

During one feeding cycle, the line shaft 67 rotates the cam disks 156 through 360° simultaneously, thereby reciprocating the shuttle member 128 forwardly and then rearwardly in each of the first four feeding devices, namely the plate feeders 14 and 14a and the separator feeders 15 and 15a. The reciprocation of the shuttle member 128 moves the bottom battery element in each compartment 127 rearwardly into position between the feed rollers 188 and 189 of the corresponding feeding mechanism 187.

In the case of the plate feeders 14 and 14a, the element gripping mechanisms 158 and 159 on opposite sides of each feeder cooperate to lift all but a few of the battery plates in their respective compartments upwardly away from said shuttle member 128. This reduces the force required to move the bottom plate rearwardly, reduces the possibility of disfiguring said bottom plate during the movement thereof, and reduces the amount of dust created by such movement. The gripping mechanisms 158 and 159 are actuated by engagement between the cams 174 on the line shaft 67 and the rocker arms 169, which operate through the lift bars 168 and the gripping plates 161 to engage and lift said battery plates.

The stripping posts 142 prevent the frontward movement of the battery elements, immediately above that element being fed, when the shuttle member 128 is returned frontwardly into position for initiating the next feeding cycle. The exhaust openings 145 in the shuttle plate 131, and the exhaust system 18 connected thereto, provide means for urging warped or distorted battery elements, particularly battery plate separators, into a relatively planar position adjacent to the upper surface of the shuttle plate 131. The positioning members 139 on the opposite sides of the limit plate 135 adjacent to the bottom edge thereof urge the rearward edges of the battery elements down. Thus, said members 139 cooperate with the suction produced by the exhaust system 18 through the openings 145 to virtually insure the successful feeding of any reasonably satisfactory battery element under the limit plate 135 without malfunctions.

After the battery elements come between the feed rollers 188 and 189, said elements are advanced to a position between the support plate 199 and the belts 197 and 198, providing the feeding mechanism 187 is in its lowered position, as shown in Figure 9. The feed rollers 188 and 189 and the belts 197 and 198 are all driven by the line shaft 175 (Figure 9), which is in turn driven through the chain 179 by the line shaft 67. The battery element is advanced by the belts 197 and 198 onto the upper courses 49 and 50 of the conveyor chains 47 and 48, respectively, for movement thereby toward the discharge end of the conveyor mechanism 12. The rollers 201 in the support plate 199 ease the movement of the battery elements onto the conveyor mechanism. The natural arch in the belts 197 and 198 provides a positive, resilient control over the movement of the elements.

The rearward ends of the feeding mechanisms 187 are pivoted toward and away from the support plate 199 about the axes of the stub shafts 184 by the lift fingers 202, which are mounted upon the rocker shaft 203. The rocker shaft 203 is oscillated by the cam 208 operated through the linkage 205, and, therefore, the pivotal movement of the feeding mechanism 187 is synchronized with the rotation of the line shaft 67. The purpose of the lifting of the feeding mechanism 187 is to free the battery elements from engagement by the belts 197 and 198 for movement toward the platform 17 by the conveyor mechanism 12. As indicated by broken lines at A in Figure 10, the battery element is disposed upon the guide member 209 and the support plate 199 when it reaches the conveyor mechanism 12.

Shortly after said battery element reaches its broken line position A (Figure 10) and after the feeding mechanism 187 has been raised by the finger 202 into its raised position (Figure 4), the hooks 58 on the chains 47 and 48 engage the trailing edge of the battery element and move it toward the platform 17. The hooks 58 are uniformly spaced along the chains 47 and 48 at distances substantially equal to the center line distance between adjacent feeding devices 14 and 15. The movement of the chains is coordinated so that one set of hooks moves said distance between successive pairs of hooks during each feeding cycle, which is one full rotation of the line shaft 67. Said chains are moved by the cam shaft 63 operating through the chain 61 and sprockets 59 and 62, said cam shaft being rotated by the line shaft 67 operating through the bevel gears 65 and 66.

As stated previously, the feeding devices 14, 14a, 15 and 15a each feed one of their respective battery elements simultaneously upon the conveyor mechanism 12 during each feeding cycle. Thus, each time a pair of hooks 58 approaches one of the feeding devices, another battery element is placed upon the conveyor chains 47 and 48 in front of the hooks and on top of those battery elements already in such position. By the time a particular pair of hooks 58 has passed from the trailing end of the assembling machine to a point beyond the separator feeder 15a, a cell unit, comprised of a negative plate, a separator, a positive plate and a separator, is formed and in position in front of the hooks 58. Thus, four feeding cycles produce a normal unit cycle. If this particular cell unit is not the last cell unit in any particular cell group, it will be moved by the conveyor past the plate feeder 14b and said plate feeder 14b will not operate. It will be apparent that the hook 58 must pass the first four feeding devices to gather a complete cell unit. Also, four cell units are being simultaneously gathered at all times. Thus, this machine has four times the output of previous machines wherein each pair of hooks 58 moves and discharges only one battery element at a time.

As shown in Figure 5, the cell unit 91 will be moved onto the transfer fingers 84 and 85 by the hooks 58. As each pair of hooks 58 reaches a position somewhere between the fingers 84 and 85, the cam disk 82 will move the cam arm 79, hence said fingers 84 and 85, leftwardly or toward the discharge end of the conveyor frame 41. However, due to the harmonic motion of said fingers, said hooks 58 will be moving faster than said fingers during the first part of said leftward movement of said fingers. Thus, said hooks 58 will continue to move the cell unit along said fingers until it is past said discharge bars 87 and 88, thereby permitting said discharge bars to be urged upwardly behind said cell unit by the springs 89. When said fingers 84 and 85 are about midway between their solid and broken line positions (Figure 5), said fingers 84 and 85 will be moving faster than the hooks 58, thereby moving the unit 91 away from in front of said hooks and permitting said hooks to move around the sprockets 52 and 53 without interfering with the cell unit 91. Thus, during the last part of the movement of the transfer fingers 84 and 85 toward their broken line positions 86, the discharge bars 87 and 88 will provide the positive means for advancing the cell unit 91 toward the platform 17.

As the cell unit 91 passes over the stripping bars 96 and 97 (Figures 5 and 7), said bars will be depressed against the contrary urging by the springs 98. When the cell unit reaches a position to the left of said stripping bars 96 and 97, as appearing in Figure 5, said stripping bars will return to their raised position shown in Figure 5, and thereby prevent the return of the cell unit onto the conveyor mechanism 12 when the fingers 84 and 85 are returned to their solid line positions, as appearing in Figure 5. Accordingly, the cell unit 91 will be dropped upon the platform 17. As described in detail above, the cam shaft 63, which rotates the cam disk 82, also rotates the conveyor chains 47 and 48, thereby synchronizing the reciprocable movement of the fingers 84 and 85 with the movement of the conveyor mechanism 12. Thus, a cell unit 91 is advanced from the conveyor mechanism 12 onto the platform 17 by the transfer fingers 84 and 85 during each feeding cycle.

With each rotation of the line shaft 67, the actuating disk 243, acting through the link rod 242, effects one complete reciprocation of the timing housing 235 upon the timing shaft 230. At the beginning of a group cycle of operation, the platform 17 is in its fully raised position, and the lever actuating arm 269 on the timing disk 238 will be spaced a predetermined arcuate distance from the lever 248. The distance between said lever 248 and said arm 269 will determine the number of complete reciprocations of said housing 235 which will be made before said lever 248 is raised by said arm 269. Thus, since the raising of said lever 248 completes a cell group, the number of said reciprocations will correspond to the number of cell units desired in the cell group, and the arm 269 is pre-set accordingly.

At the beginning of the formation of a cell group, the first reciprocation of the housing 235 causes the pawl 246 to engage a notch 239 on the periphery 241 of the timing disk 238 (Figure 15), thereby moving the timing disk 238 a short distance counterclockwise. The upper surface 253 of the arm 249 is so shaped and positioned that its engagement with the pawl roller 254 on the pawl 246 permits the pawl 246 to engage a notch 239 just before said housing reaches its extreme leftward position. Thus, the timing disk 238 is moved just far enough to permit disengagement of the stop pawl 257 from another notch 239 on the timing disk 238. At the same time, the latch roller 274 is engaging and depressing the upper arm 264 of the lever latch 258, thereby compressing the pawl spring 263 and urging the stop pawl 257 away from the periphery of the timing disk 238. Before said pawl 257 can re-engage said disk 238, the notch 239, from which said stop pawl has just been disengaged, will rotate past said stop pawl 257, whereupon said stop pawl engages the next notch 239 along said periphery 241. This one notch advancement of the disk 238 is transmitted through the timing shaft 230 and the elevator bars 117 and 118 to the platform 17, whereby said platform is first raised slightly, while the stop pawl 257 is being disengaged from the notch 239 in which it is disposed, and then lowered a distance substantially equal to the thickness of the cell unit 91 which has just been placed upon the platform 17. This step-by-step lowering of the platform 17 corresponds to the notch-by-notch movement of the timing disk 238 past the stop pawl 257 and is continued until the lever actuating arm 269 operates the clutch switch 276, thereby operating the negative plate feeder 14b to place a fifth battery element on the cell unit 91 disposed in front of the plate feeder 14b. This particular cell unit will become the last cell unit in a cell group being formed on the platform 17.

With the next actuation of the housing 235 by the actuating disk 243, the pusher bar switch 278 will be closed by the lever 248, due to the upward urging thereof by the actuating arm 269, thereby energizing the solenoid 279, which moves the pawl 105 into position for engagement with the notch 106 in the bracket 107 on the cam arm 79. Accordingly, the next operation of the cam arm 79 by the cam disk 82 will effect a leftward movement (Figure 5) of the cell group along said platform to provide room for another group. Simultaneously with the movement of said cell group pusher, the platform 17 will be raised, as described immediately hereinafter, to receive the next cell unit 91 being formed and conveyed thereonto by the conveyor mechanism 12.

When the lever 248 is engaged by the actuating arm 269, it is moved into engagement with the lever latch 258, thereby holding the timing arm 249 downwardly and rightwardly (Figure 15) so that it will not prevent the pawl 246 from engaging the first notch 239 which it may encounter on the periphery 241 of the timing disk 238. Thus, when said next reciprocation of said housing 235 occurs, as a result of the next feeding cycle, said pawl will engage said first notch 239 which it encounters along the periphery 241, thereby rotating the disk 238 completely back to its initial position, whereby said platform 17 is raised to its initial position. Such counterclockwise rotation of the disk 238 will move the actuating arm 269 away from the lever 248. Accordingly, when the latch roller 274 engages the lever latch 258, thereby disengaging its hook 268 from the lock pin 266 on the lever 248, said lever will drop back into its lowered position.

When the roller 274 is disengaged from the latch 258, the stop pawl will be permitted to rotate counterclockwise (Figure 15) and again engage the periphery of the timing disk 238 and prevent said timing disk from rotating in a clockwise direction (Figure 15) under the weight of the platform 17 and parts attached thereto. This places the machine 10 in condition to commence another group cycle for assembling another cell group. The same notch-by-notch advancement of the timing disk 238 in a clockwise direction will be repeated until the lever actuating arm 269 again engages the lever 248, signifying the end of another cell group.

If, during the sequence of operations of the assembling machine 10, any feeding device 14 or 15 fails to feed a battery element at the proper time onto the conveyor mechanism 12, the feed switch 283 mounted upon the feeding mechanism 187 corresponding to that particular malfunctioning feeding device, will remain open. Due to the fact that the disconnect switch 286 is in parallel with said feed switch and is also open, the motor 71 will be de-energized and the assembling machine 10 stopped. Obviously, the blower motor 211 may also be connected in this cutoff circuit and thereby de-energized along with the motor 71.

Figure 17 discloses schematically, for comparison purposes, the relative arrangement between the conveyor mechanism 12 and the feeding devices 14 or 15 in the particular embodiment of my invention described in detail hereinabove. It will be apparent that the battery elements may be stacked in said feeding devices so that they will be fed onto the conveyor mechanism 12 either sidewise, as shown in Figure 17, or endwise, as shown in Figure 18. Also, this invention contemplates the location of one or more, including all, of said feeding devices in a line above, and parallel with, said conveyor mechanism, as indicated in Figures 19, 21 and 22, wherein the numeral 14 and its derivatives indicate plate feeders, and the numeral 15 and its derivatives indicate separator feeders.

In the preferred embodiment, the battery elements are disposed horizontally upon said conveyor mechanism 12, or upon each other in piles. However, as shown in Figure 20, the conveyor mechanism may be provided with pivotally supported, normally upright, brackets "B" for receiving said elements in substantially upright and parallel positions from feeding devices located a suitable distance above the conveyor mechanism 12. Thus, the entire apparatus for forming a single cell unit may be arranged to produce such a unit in much less distance than is possible with the structure of the principal embodiment and the assembly of a cell unit may proceed correspondingly more rapidly.

Accordingly, we have disclosed a particular, preferred embodiment of our invention for illustrative purposes. However, it will be recognized that variations or modifications may be made in the assembling machine specifically disclosed herein, without departing from the scope of such invention, unless specifically stated to the contrary in the appended claims.

We claim:

1. An automatic machine for assembling cell groups of battery plates and plate separators, comprising: a frame structure; a conveyor mounted upon said frame structure and having a plurality of spaced loading positions thereon; means effecting movement of said positions along a substantially horizontal path; an equal number of constantly operating plate feeders and separator feeders alternately disposed at intervals along said path for piling individual plates and separators, respectively, onto each position as it passes each said feeder, thereby forming a unit of contiguous plates and separators alternatingly disposed with a plate on the bottom of each unit on each position at the terminus of said path; an intermittently operating plate feeder disposed along said path adjacent to said terminus; control means for actuating said intermittent plate feeder, after a predetermined amount of movement of said conveyor and after a predetermined number of feeding operations of said constantly operating feeders, to deposit a plate upon selected ones of said units; a platform at said terminus and means for transferring said units from said positions onto said platform; and ejection means for moving a group of units along said platform after each transfer of a selected unit.

2. The structure of claim 1 including mechanism responsive to the operation of said control means and movement of said conveyor for lowering said platform a distance substantially equal to the thickness of a said unit after the transfer of each unit onto said platform, said platform being raised by said mechanism to a position substantially level with said path immediately after each operation of said ejection means.

3. An automatic machine for assembling cell groups of battery plates and plate separators, comprising: a frame structure; a conveyor mounted upon said structure and having a plurality of uniformly spaced receiving positions disposed therealong; means effecting movement of said positions along a substantially horizontal path; a plurality of constantly operating plate feeders disposed at uniform intervals along said path for depositing a plate on each position as it passes each feeder; an equal number of constantly operating separator feeders disposed along said path, one separator feeder, following each plate feeder, for depositing a separator on each position as it passes each separator feeder, thereby forming a cell unit of plates and separators with a plate at the bottom of each unit in each position as it reaches the discharge end of said conveyor; an intermittently operating plate feeder disposed along said path and adjacent to said discharge end; control mechanism for actuating said intermittent plate feeder, after a predetermined amount of movement of said conveyor and after a predetermined number of feeding operations of said constantly operating feeders, to deposit a plate upon selected ones of said units; a platform at said end of said conveyor and means for discharging said units onto said platform in contiguity with each other; and ejection means for moving the contiguous units along said platform each time a said selected unit is discharged thereon.

4. The structure of claim 3 wherein means responsive to, and cooperable with, said movement of said positions is provided on said structure for operating all of said feeders, except said intermittently operating plate feeder, simultaneously each time a position moves the distance between a pair of adjacent feeders, and wherein said intermittently operating plate feeder operates simultaneously with the remaining feeders when a selected unit is adjacent to said intermittently operating plate feeder.

5. The structure of claim 3 wherein said means for effecting movement of said positions includes: a source of electrical energy; a normally closed switch in series with said source; means holding said switch open momentarily during the simultaneous operation of said feeders; a plurality of normally open switches in a series circuit parallel with said closed switch, each said open switch being associated with a said feeder, other than said intermittently operating feeder, and said open switches being closable by said plates and separators when said closed switch is open; and a self-locking switch having a locking coil in series with said closed switch and said series circuit, whereby said source is disconnected from said machine if any open switch is not closed when said closed switch is open.

6. The device defined in claim 3 wherein said platform is moved downwardly with respect to said path a distance substantially equal to the thickness of one of said units each time one of said units is placed thereon; and including means responsive to the total vertical movement of said platform and the operation of said control mechanism for returning said platform to a position substantially co-planar with said path for receiving the first unit of a subsequent cell group.

7. An automatic machine for assembling battery cell groups from independent stacks of battery plates and plate separators, comprising in combination: a frame structure; five uniformly spaced feeding devices arranged along a path, with a stack of negative plates in the first device, a stack of separators in the second device, a stack of positive plates in the third device, a stack of separators in the fourth device, and a stack of negative plates in the fifth device, said first four devices being adapted for feeding elements one at a time from said stacks onto said path and substantially simultaneously with respect to each other; a conveyor movable along said path and carrying equally spaced impellers thereon, the spacing between said impellers being an even multiple of the spacing between said devices; means moving said conveyor an even multiple of said spacing between said devices each time said first four devices feed an element into said path; a platform adjacent to the end of said conveyor and means for moving successively formed units from said conveyor onto said platform; means lowering said platform a distance substantially equal to the height of one of said units each time, and immediately after, one of said units is placed thereon; control means for actuating the fifth device, after a predetermined number of said units have been placed on said platform, to place a negative plate on the top of the last unit in said number; and means responsive to operation of said control means for moving said number of units along said platform and raising said platform to the level of said conveyor thereafter to repeat the cycle.

8. In an automatic machine for assembling battery elements into cell groups, said machine having an elongated, movable conveyor and a compartment disposed adjacent to said conveyor for holding said elements, mechanism for moving said elements from said compartment onto said conveyor, comprising: a reciprocable member at the bottom of said compartment; drive means for reciprocating said member toward and away from said conveyor; a support surface located between said conveyor and the bottom of said compartment for receiving elements from said compartment; rotary means disposed above said surface and having an axis transverse to the path of said reciprocation, said elements being advanced by said rotary means along said surface and onto said conveyor; and means effecting periodic movement of said rotary means toward and away from said surface, such movement being responsive to the reciprocation of said member and coordinated with the movement of said conveyor.

9. The structure of claim 8 wherein there is a plurality of compartments, each having a said mechanism for moving said elements onto said conveyor, wherein said drive mechanism includes a motor connected to a source of electric energy through a normally closed disconnect switch and cam means for opening said switch momentarily while said rotary means is in its lower position, and wherein normally open switches are mounted, respectively, above each said surface, each open switch being closed by an element passing therebeneath when said rotary means is in said lower position, such closure occurring before, during and after the period when said disconnect switch is open, and said open switches being in series with each other and in parallel with said disconnect switch.

References Cited in the file of this patent

UNITED STATES PATENTS

| | | |
|---|---|---|
| 475,376 | Appleby | May 24, 1892 |
| 1,801,696 | Semashko | Apr. 21, 1931 |
| 2,161,054 | Jepson | June 6, 1939 |
| 2,215,990 | Anderson | Sept. 24, 1940 |
| 2,324,523 | Lund | July 20, 1943 |
| 2,362,134 | Honig | Nov. 7, 1944 |
| 2,496,438 | Brandt | Feb. 7, 1950 |
| 2,568,248 | Nichols et al. | Sept. 18, 1951 |
| 2,626,038 | Smith | Jan. 20, 1953 |
| 2,652,933 | Willard | Sept. 22, 1953 |
| 2,675,928 | Slater | Apr. 20, 1954 |
| 2,680,610 | Donath | June 8, 1954 |
| 2,704,593 | Galloway | Mar. 22, 1955 |
| 2,741,927 | Hollander | Apr. 17, 1956 |
| 2,790,536 | Reed | Apr. 30, 1957 |
| 2,819,806 | Vieth | Jan. 14, 1958 |
| 2,830,692 | Winkel | Apr. 15, 1958 |